United States Patent
Lawson et al.

(10) Patent No.: US 8,145,799 B2
(45) Date of Patent: Mar. 27, 2012

(54) SYSTEMS AND METHODS FOR CHANGING PARAMETERS OF A CONTROLLER

(75) Inventors: Richard Lee Lawson, Oak Grove, MO (US); David Patrick Kickham, Blue Springs, MO (US); Clifton Douglas Chandler, Olathe, KS (US)

(73) Assignee: General Electric Company, Schenectady, NY (US)

( * ) Notice: Subject to any disclaimer, the term of this patent is extended or adjusted under 35 U.S.C. 154(b) by 938 days.

(21) Appl. No.: 11/750,486

(22) Filed: May 18, 2007

(65) Prior Publication Data

US 2008/0288736 A1 Nov. 20, 2008

(51) Int. Cl.
 *G06F 3/00* (2006.01)
(52) U.S. Cl. ......................................................... 710/8
(58) Field of Classification Search .................... 710/8
 See application file for complete search history.

(56) References Cited

U.S. PATENT DOCUMENTS

| | | | |
|---|---|---|---|
| 5,642,353 A | 6/1997 | Roy, III et al. | |
| 6,144,901 A | 11/2000 | Nickles et al. | |
| 6,263,266 B1 | 7/2001 | Hawthorne | |
| 6,587,764 B2 | 7/2003 | Nickles et al. | |
| 6,622,068 B2 | 9/2003 | Hawthorne | |
| 6,898,149 B2* | 5/2005 | Hill et al. | 367/82 |
| 6,997,418 B1 | 2/2006 | Sanzone | |
| 7,215,092 B2 | 5/2007 | Grubba et al. | |
| 7,673,133 B2* | 3/2010 | Wesemann | 713/151 |
| 2002/0107922 A1* | 8/2002 | Nakamura et al. | 709/205 |
| 2005/0225427 A1 | 10/2005 | Bell et al. | |
| 2006/0107061 A1 | 5/2006 | Holovacs | |

FOREIGN PATENT DOCUMENTS

EP 1659473 A 5/2006

OTHER PUBLICATIONS

PCT International Search Report, dated Dec. 19, 2008.

* cited by examiner

*Primary Examiner* — Chun-Kuan Lee
(74) *Attorney, Agent, or Firm* — GE Global Patent Operation; John A. Kramer

(57) ABSTRACT

Systems and methods for modifying a parameter value of a controller are described. In one embodiment, the method includes verifying a local presence at the controller, modifying a parameter value at a remote device, confirming the identity of the remote device, and storing the modified parameter value in the controller.

13 Claims, 3 Drawing Sheets

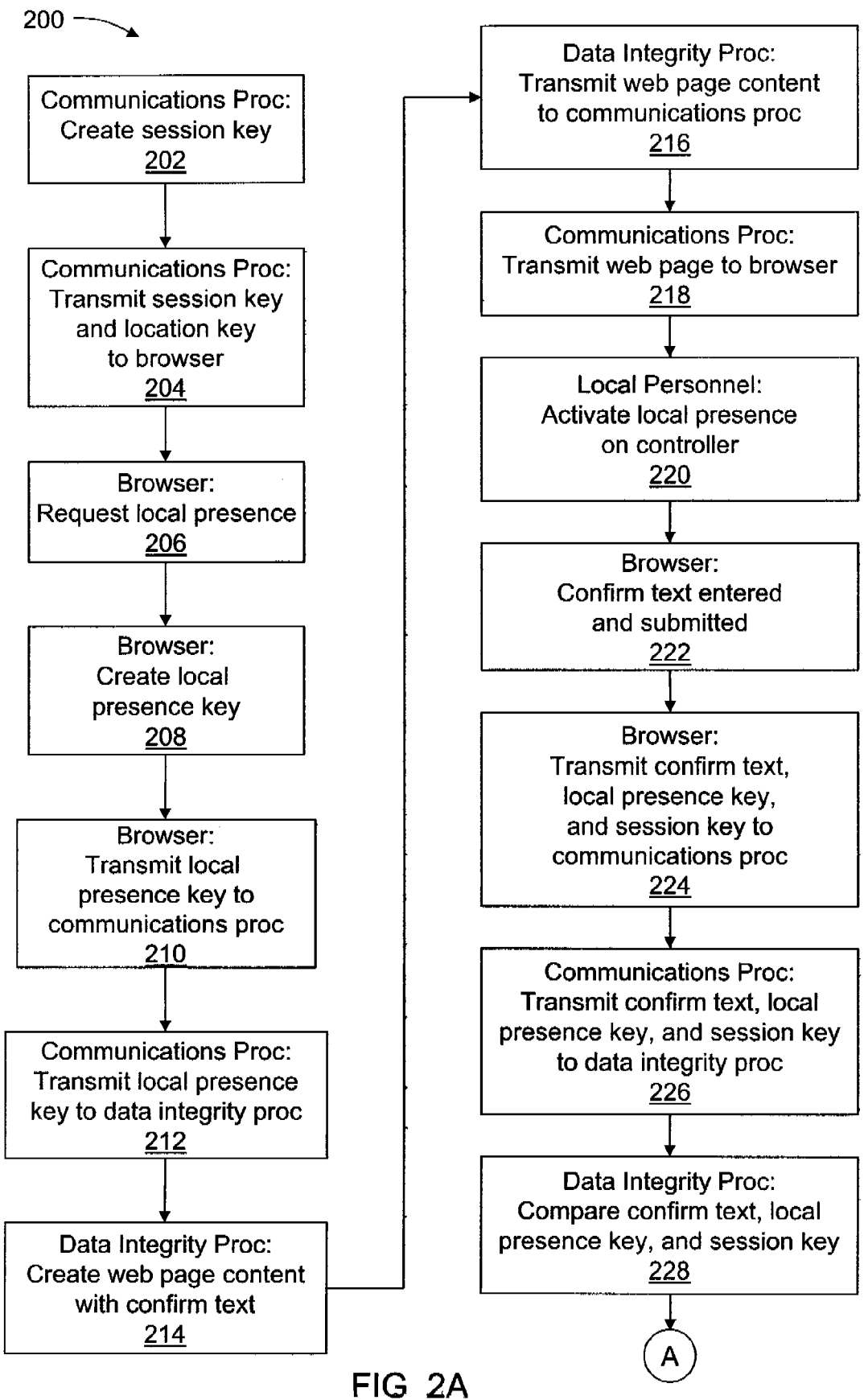

SYSTEMS AND METHODS FOR CHANGING PARAMETERS OF A CONTROLLER

BACKGROUND OF THE INVENTION

This invention relates generally to signal controls and more specifically to controlling a signaling device by remotely modifying a safety related parameter.

In a signaling or crossing installation controlled by a controller, certain parameters are set to site-specific values. Maintaining an on site specialist, or regularly sending a specialist to a site, is expensive and time consuming. As such, a remote access portal may be available to access such a controller. Changing a parameter of the controller may require personnel to do so at the controller itself via a dedicated, special purpose data entry and display device. The methods involve using the keypad on the controller to ensure that personnel was actually present, and to allow the user to select and/or enter the desired data. Use of the keypad also allowed the user to confirm the entered data through an additional button press.

BRIEF DESCRIPTION OF THE INVENTION

In one aspect, a method for modifying a parameter value of a controller includes verifying a local presence at the controller, modifying a parameter value at a remote device, confirming the identity of the remote device, and storing the modified parameter value in the controller.

In another aspect, a method for modifying a parameter value of a railroad signal controller includes creating a session key, storing the session key in a memory of the controller, verifying a local presence at the controller, modifying a parameter value at a remote web browser, confirming the identity of the web browser, and storing the modified parameter value in the memory of the controller.

In another aspect, a system for modifying a parameter value of a railroad signal controller includes a controller and a computer. The controller includes a local presence button, a communications processor, and at least one data integrity processor. The computer includes a web browser. The system is configured to create a session key, store the session key in a memory of the controller, verify a local presence at the controller, modify a parameter value at the web browser, confirm the identity of the web browser, and store the modified parameter value in the memory of the controller.

BRIEF DESCRIPTION OF THE DRAWINGS

FIGS. 2A and 2B show a flow chart of an exemplary method for modifying a parameter of a controller.

DETAILED DESCRIPTION OF THE INVENTION

As used herein, the term "controller" may include any host server configured to store parameter data, create and serve web pages, and/or control signals and/or systems. A railroad signal controller is intended as exemplary only, and thus is not intended to limit in any way the definition and/or meaning of the term "controller." Furthermore, although the invention is described herein in association with a railroad signal, it should be understood that the present invention is applicable to other host server systems. Accordingly, practice of the present invention is not limited to railroad signal controllers.

Any method or process of setting or changing a parameter of a signaling controller must ensure that the value of the parameter entered by a remote user is, in fact, the value that is received and used by the controller. The method must ensure that a person is located at the controller, that the entered data is not corrupted between the input point and the controller, that the remote user confirms that the data to be used by the controller is the data that was actually entered, and that the parameter changes submitted are sent to the intended controller. All of these steps must have immunity from noise on the interface, inadvertent entry or selection by the remote user, and/or possible resubmission of stale data by the remote user.

Figure 1:
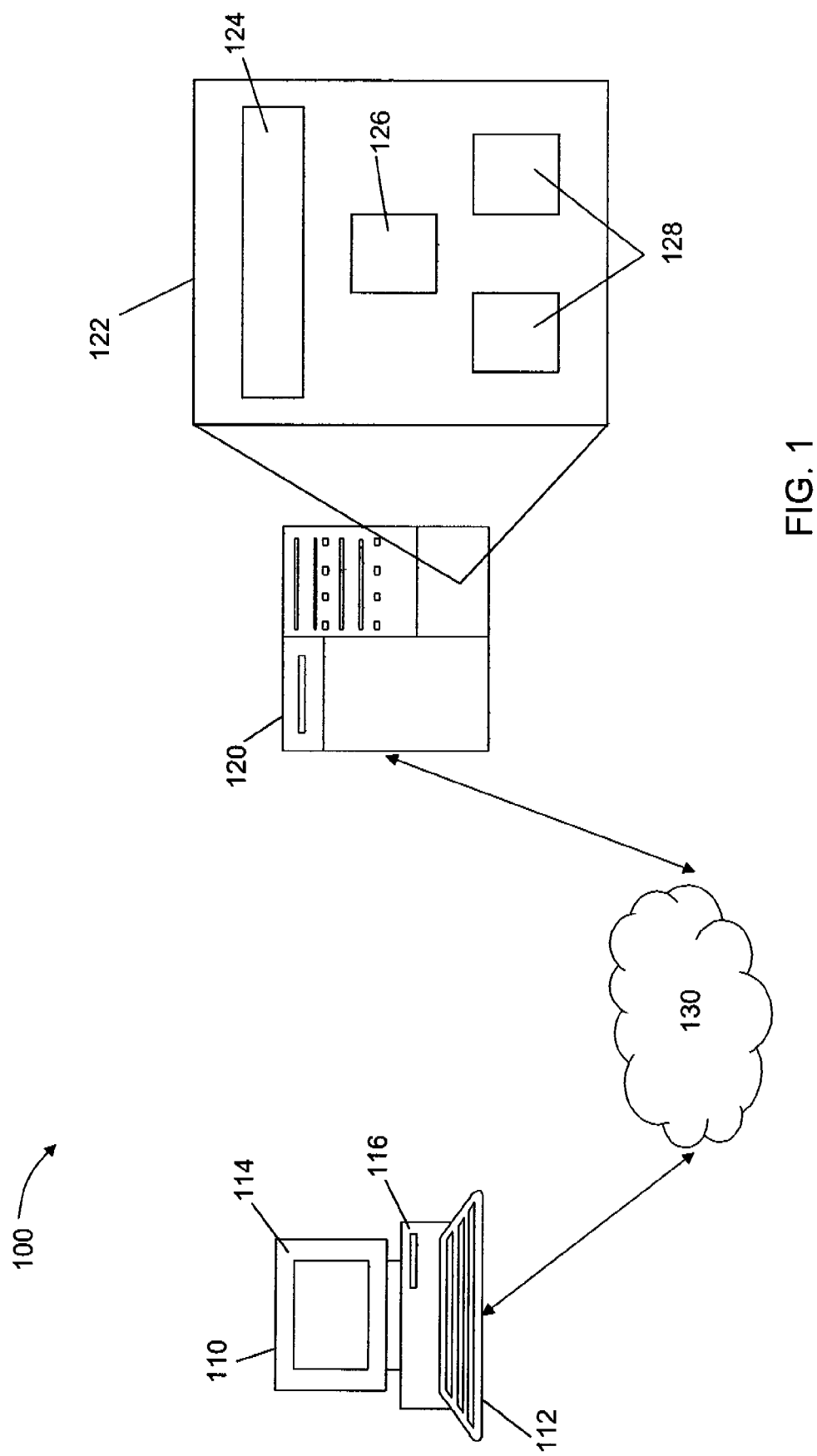
FIG. 1 is a schematic of an exemplary interface system for changing configurable parameters of a railroad signal controller.

FIG. 1 is a schematic illustration of an exemplary interface system 100 for changing configurable parameters of a railroad signal controller 120. System 100 includes a computer system 110 from which a remote user accesses controller 120. Computer system 110 includes a user input 112, a display 114, a processor 116, and a commercially available web browser (not shown) such as, but not limited to, Microsoft Internet Explorer or Mozilla Firefox. The web browser has the ability to display web pages containing scripting languages such as, but not limited to, JavaScript. Computer system 110 may be a complete off the shelf (COTS) unit or custom built to pre-determined specifications.

Computer system 110 connects to controller 120 via a standard Internet connection 130. Communication between computer system 110 and controller 120 is based on a client-server relationship using established protocols such has, but not limited to, Internet Protocol (IP).

Controller 120 is installed at a site that includes a railroad signal or crossing. Controller 120 includes a hardware module 122, shown in FIG. 1 in exploded form, and a local presence button (not shown). The local presence button is pressed by personnel located at the signal site to verify that such personnel is present at the signal site if necessary. When modifying a parameter value using the methods and systems described herein, the local personnel is required to activate a local presence flag in controller 120 by, for example, pressing a local presence button to signal to controller 120 that the local presence requirement is met. Such personnel may be less experienced than the remote specialist tasked with modifying any parameters within controller 120.

In the exemplary embodiment, hardware module 122 includes an Ethernet interface 124, a communications processor 126, and two data integrity processors 128. Ethernet interface 124 allows controller 120 to connect to the Internet 130 and has a unique Internet address to which a remote user directs a web browser. Communications processor 126 serves web pages and passes data to, and receives data from, data integrity processors 128, via an internal interface (not shown), and remote computer system 110 via Ethernet interface 124. Data integrity processors 128 cross-check data transmitted from communications processor 126. Data integrity processors 128 also store, compare, and combine temporary but unique keys associated with the methods described below. Finally, data integrity processors 128 create web page content that is served to the web browser by communications processor 126, also described below. Controller 120 also includes memory (not shown) for storing a database of, for example, passwords and login IDs. In the exemplary embodiment, the database contains a password equivalent value which is a combination of the actual password associated with a particular user and a specific location key unique to a particular controller 120.

Figure 2B:
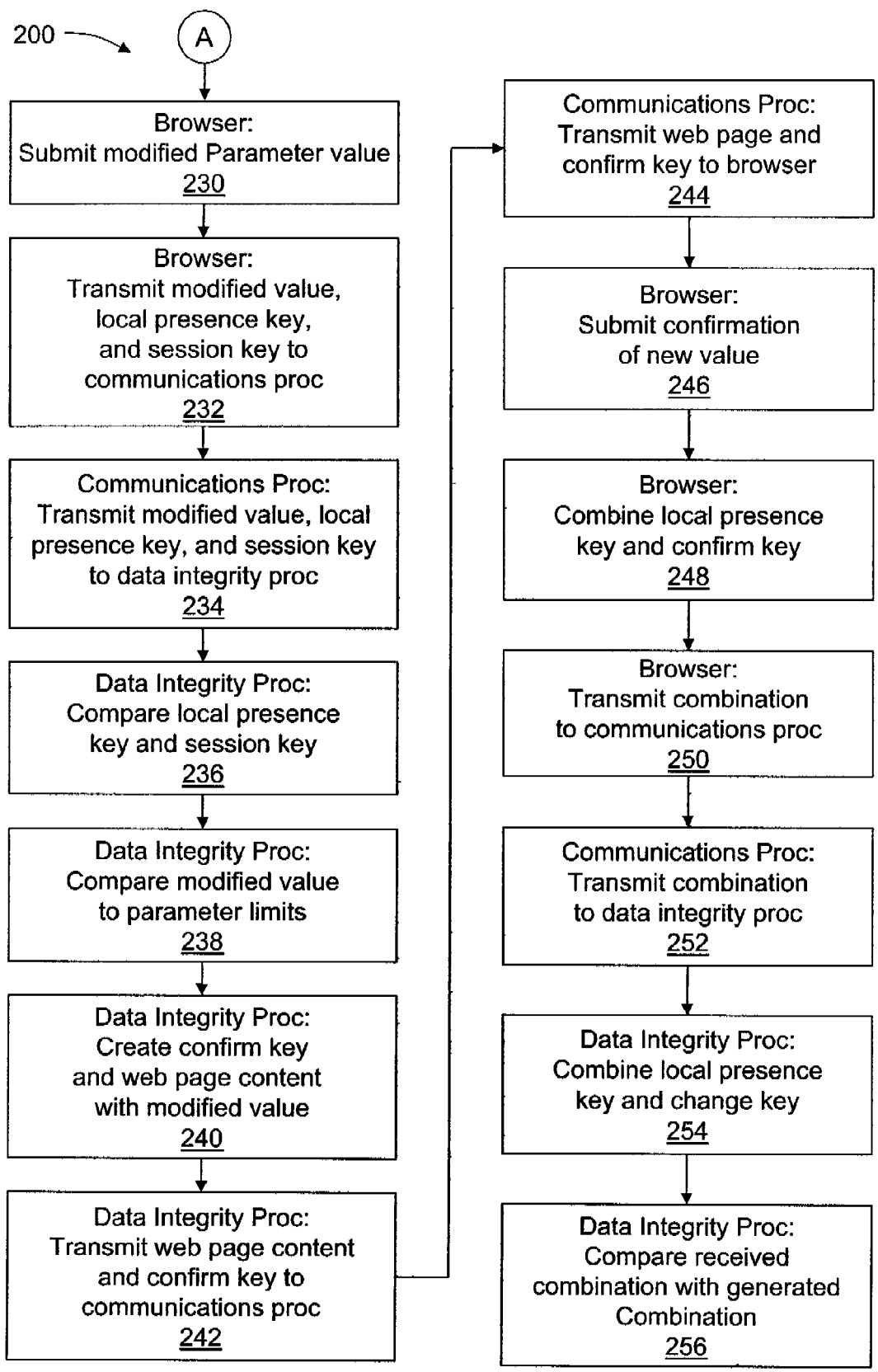

During use, a remote user must first login to controller 120 from the web browser of computer system 110. Upon successfully logging into controller 120, a remote user is presented with a home page. From the home page, the user may then choose to, for example, update a parameter of controller 120. FIGS. 2A and 2B show a flow chart of an exemplary method 200 for modifying a parameter of controller 120.

As shown in FIG. 2A, and when attempting to login to controller 120 from computer system 110, a remote user directs the web browser to a pre-determined home page associated with a unique IP address for controller 120. Access protection for controller 120 is provided via a "password required" login. During a login attempt communications processor 126 creates 202 a one-time-use session key value that is valid for only one login session from a particular web browser. Communications processor 126 transmits 204 the session key value to the web browser along with a location key value that is unique to controller 120. The location key may be used to verify both the data integrity and the authenticity of a message.

In the exemplary embodiment, and when the remote user has successfully logged into controller 120, there must be confirmation of a local presence at the controller (railroad) site before a parameter may be changed. Requiring a local presence helps to ensure that the parameter change is implemented as intended and only on the intended controller. As shown in FIG. 2A, the remote user navigates, using the web browser, to a Local Presence web page and submits 206 a request for local presence. The web browser then creates 208 a local presence key value which is transmitted 210 from the web browser to communications processor 126, and then transmitted 212 from communications processor 126 to data integrity processors 128.

In response to receiving a request for local presence, and after receiving the local presence key value and the session key value, data integrity processors 128 create 214 confirmation web page content that includes a confirmation text string. This web page content is transmitted 216 to communications processor 126 and then served 218 to the web browser. The local personnel is also required to activate 220 the local presence on controller 120 by, for example, pushing a button. The remote user then enters the confirmation text string into a provided text field and submits 222 a confirmation of the local presence request from the web browser. The web browser transmits 224 the confirmation text string, the local presence key value, and the session key value to communications processor 126 which, in turn, transmits 226 the same to data integrity processors 128. Data integrity processors 128 compare 228 the received values with those stored earlier in the process. If the local presence at controller 120 is activated in the correct process sequence and within a pre-determined time period, and the comparisons of values received by data integrity processors 128 are successful, local presence at the site is confirmed, shown as point A in FIG. 2A.

Once a local presence has been confirmed, the remote user may request a change to a parameter. As shown in FIG. 2B, the remote user navigates, using the web browser, to a configuration web page and submits 230 a modified value for a parameter. The web browser transmits 232 the modified value, local presence key value, and session key value to communications processor 126, which then transmits 234 the same information to data integrity processors 128.

FIG. 2B further shows a procedure for confirming the identity of the remote web browser. This is necessary to ensure that the parameter change is being attempted at the desired site, as well as to ensure that the web browser is the same as that used to login and obtain a local presence. The web browser's identity is ensured through the use of the one-time-use session key value and the one-time-use local presence key value described above. As such, data integrity processors 128 compare 236 the local presence key value and session key value sent to controller 120 with the modified parameter value, with the key values stored in the memory of controller 120. A match of both the local presence key value and the session key value indicates that the web browser session from which the modified parameter value originated is the same as that used by the remote user to login and obtain local presence.

After data integrity processors 128 have confirmed the identity of the web browser, the parameter value may be changed within controller 120. First, data integrity processors 128 compare 238 the modified parameter value against pre-determined limits. If the modified parameter value is within the pre-determined limits, data integrity processors 128 create 240 a confirmation key value and web page content containing the modified parameter value, and transmit 242 this data to communications processor 126. Communications processor 126 then transmits 244 the web page and confirmation key value to the web browser. If the displayed modified parameter value is the same as the remote user had initially input, the remote user submits 246 a confirmation of that value. The web browser combines 248 the local presence key value and the confirmation key value using a logical operation such as, but not limited to, a bit-wise exclusive or (XOR) operation, and transmits 250 the combination to communications processor 126. Communications processor 126 transmits 252 the combination to data integrity processors 128. The same logical operation is completed 254 by data integrity processors 128 and the result is compared 256 against the combination received from communications processor 126. If the combinations match, then the modified parameter value is saved for the site.

The above-described methods and apparatus facilitate improving control of a controller through the use of a remote portal. Parameter changes may be performed without having to use and/or administer message level encryption or have in-line network devices that encrypt the entire network traffic. The requirement of a local presence at the controller ensures safety related parameters are changed only on the correct controller and the controller functions properly after the parameter has been changed. The use of a session key value and a local presence key value facilitates correctly identifying the point from which the request for a parameter change originated and that the controller being modified is the intended controller.

Exemplary embodiments of methods and apparatus for changing a data integrity parameter value or setting are described in detail above. The methods and apparatus are not limited to use with the specific embodiments described herein, but rather, components of the methods and apparatus may be utilized independently and separately from other components described herein. Moreover, the invention is not limited to the embodiments of the methods and apparatus described above in detail. Rather, other variations of the methods and apparatus may be utilized within the spirit and scope of the claims.

While the invention has been described in terms of various specific embodiments, those skilled in the art will recognize that the invention can be practiced with modification within the spirit and scope of the claims.

What is claimed is:

1. A method for modifying a parameter value of a controller, said method comprising:
   receiving a local presence key at the controller from a remote device;
   receiving a request for confirmation of a local presence at the controller from the remote device, the confirmation associated with the local presence key;
   receiving confirmation of the local presence at the controller;
   receiving a modified parameter value from the remote device;
   confirming the identity of the remote device based on a confirmation text string that is created in response to receiving the request for confirmation and the local presence key and on a received confirmation from the remote device, the confirmation based on the confirmation text string; and
   storing the modified parameter value in the controller.

2. A method in accordance with claim 1 wherein receiving a request for confirmation of the local presence at the controller comprises:
   confirming the identity of the remote device from which the request originated; and
   activating a local presence flag in the controller.

3. A method in accordance with claim 2 wherein confirming the identity of the remote device comprises:
   creating a web page that includes the confirmation text string;
   storing the confirmation text string in a memory of the controller;
   comparing the confirmation text string received by the controller from the remote device, with the confirmation text string stored in the memory of the controller; and
   comparing the local presence key received by the controller with the local presence key stored in the memory of the controller.

4. A method in accordance with claim 1 wherein receiving the local presence key comprises:
   storing the local presence key in a memory of the controller.

5. A method in accordance with claim 1 wherein receiving the modified parameter value from the remote device comprises:
   comparing the local presence key received by the controller with the local presence key stored in a memory of the controller; and
   comparing the modified parameter value received by the controller with pre-determined parameter value limits.

6. A method in accordance with claim 1 wherein storing the modified parameter value in the controller comprises replacing a current parameter value stored in the memory of the controller, with the modified parameter value.

7. A method for modifying a parameter value of a railroad signal controller, said method comprising:
   creating a session key;
   receiving a local presence key at the controller from a web browser;
   receiving a request for confirmation of a local presence at the controller from the web browser, the confirmation based on the local presence key;
   storing the session key and the local presence key in a memory of the controller;
   verifying a local presence at the controller;
   receiving a modified parameter value from the web browser;
   confirming the identity of a remote user associated with the web browser based on a confirmation text string that is created in response to receiving the request for confirmation and the local presence key and on a received confirmation from the remote device, the confirmation based on the confirmation text string; and
   storing the modified parameter value in the memory of the controller.

8. A method in accordance with claim 7 wherein verifying the local presence at the controller comprises:
   requesting the local presence from the web browser; and
   activating a local presence flag in the controller.

9. A method in accordance with claim 7 wherein confirming the identity of the web browser comprises:
   creating a confirmation web page that includes a the confirmation text string;
   storing the confirmation text string in the memory of the controller;
   receiving the confirmation text string in a text field of the web page;
   receiving the confirmation text string, the local presence key, and the session key from the web browser at the controller;
   comparing the confirmation text string received at the controller, with the confirmation text string stored in the memory of the controller;
   comparing the local presence key received at the controller with the local presence key stored in the memory of the controller; and
   comparing the session key received at the controller with the session key stored in the memory of the controller.

10. A method in accordance with claim 7 wherein receiving the modified parameter value from the web browser comprises:
    receiving the modified parameter value, the local presence key, and the session key from the web browser;
    comparing the local presence key received at the controller with the local presence key stored in the memory of the controller; and
    comparing the modified parameter value received at the controller with pre-determined parameter value limits.

11. A method in accordance with claim 7 wherein storing the modified parameter value in the controller comprises replacing a current parameter value stored in the memory of the controller, with the modified parameter value.

12. A system for modifying a parameter value of a railroad signal controller, said system comprising:
    a controller comprising:
      a local presence button;
      a memory; and
      at least one processor; and
    a computer including a web browser, said system configured to:
      creating a session key;
      receive a local presence key at the controller from the web browser;
      receive a request for confirmation of a local presence at the controller from the web browser, the confirmation based on the local presence key and a user activation;
      store the session key and the local presence key in a memory of the controller;
      verify a local presence at the controller;
      receive a modified a parameter value from the web browser based on the received confirmation of the local presence;

confirm the identity of a user associated with the web browser device based on a confirmation text string that is created in response to receiving the request for confirmation and the local presence key and on a received confirmation from the remote device, the confirmation based on the confirmation text string; and store the modified parameter value in the memory of the controller.

13. A system in accordance with claim 12, wherein said system is further configured to receive the modified parameter value at the web browser based on:

comparing the local presence key received by the controller with local presence key stored in the memory the controller; and comparing the modified parameter value received at the controller with pre-determined parameter value limits.

* * * * *